United States Patent
Renault

Patent Number: 6,070,905
Date of Patent: Jun. 6, 2000

[54] SHOCK-ABSORBING INNER LINING

[75] Inventor: Eric Renault, Aubergenville, France

[73] Assignee: Rieter Automotive (International) AG, Zollikon, Switzerland

[21] Appl. No.: 09/180,487

[22] PCT Filed: Jun. 4, 1997

[86] PCT No.: PCT/CH97/00226

§ 371 Date: Nov. 12, 1998

§ 102(e) Date: Nov. 12, 1998

[87] PCT Pub. No.: WO97/46423

PCT Pub. Date: Dec. 11, 1997

[30] Foreign Application Priority Data

Jun. 5, 1996 [CH] Switzerland .............................. 1415/96

[51] Int. Cl.[7] ................................ B60R 21/04; B60J 7/00
[52] U.S. Cl. ........................................... 280/751; 296/189
[58] Field of Search .................................... 280/751, 752, 280/748; 296/188, 189

[56] References Cited

U.S. PATENT DOCUMENTS

| | | | |
|---|---|---|---|
| 3,224,924 | 12/1965 | Ardenne et al. | 428/117 |
| 5,435,619 | 7/1995 | Nakae et al. | 296/189 |
| 5,816,613 | 10/1998 | Specht et al. | 280/753 |

*Primary Examiner*—Paul N. Dickson
*Assistant Examiner*—Faye M. Fleming
*Attorney, Agent, or Firm*—Nath & Associates PLLC; Gary M. Nath; Harold L. Novick

[57] ABSTRACT

Liner (1) with a plurality of shock absorbing elements (7) being distributed over the entire surface, said shock abosrbing elements (7) being decoupled from the vehicle bottom (3) with the aid of a decoupling layer (9). Between these light-weight shock absorbing elements (7) a spring layer (8) is arranged, which interacts with a heavy layer (2) arranged on the passenger compartment side as an acoustically effective spring-mass-system. In a preferred embodiment of the invention, the spring layer (8) comprises an air spring. The shock absorbing elements (7) take up around 40% to 60% of the entire surface.

11 Claims, 2 Drawing Sheets

SHOCK-ABSORBING INNER LINING

The present invention concerns a liner for the passenger compartments of motor vehicles according to the preamble of claim 1.

At frontal collisions of automobiles the driver and the front-seat passenger are catapulted against the front panel of the passenger compartment. In modern vehicles, safety belts and airbags serve to largely avoid or at least reduce severe injuries which can be caused thereby. Unfortunately, these safety measures cannot prevent the passengers' legs from being catapulted against the front part of the passenger compartment and from impacting in the leg room. This impact effects the pelvic area and can cause severe and complicated injuries there.

It is therefore the aim of the modern automobile industry to equip at least the front part of the leg room of motor vehicles with shock absorbing means, without limiting the freedom of movement of the passengers and, in particular, without reducing the leg room available in the interior of the passenger compartment.

In conventional middle- and upper-class motor vehicles as well as in trucks, the leg room of the passenger compartment is covered with an approx. 35 mm thick liner. This liner usually comprises a more or less expensive carpet layer which is in turn backed with an acoustically effective insulation layer. Such sound insulating compound systems are well known and are described, for example, in U.S. Pat. No. 5,088,576. In these compound systems the carpet pile is bound to a rubber-like sub-layer or is carried by an additional bendable and relatively heavy carrier layer (both being called heavy-layer or mass-layer by the expert), and is combined with a elastic and preferably light fleece or foam layer (also called spring-layer by the expert). Such spring-mass-systems are capable of eliminating the noise caused by the vibration of the vehicle bottom; they do not, however, have particularly shock absorbing properties.

An additional shock absorbing layer would, however, either increase the total thickness of the vehicle liner or it could be combined with the carpet layer at the expense of its noise insulating properties.

It is therefore the aim of the present invention to provide a liner for motor vehicles which has a predetermined thickness as well as shock absorbing and noise insulating properties, i.e. which is stiff enough to specifically reduce the energy impact during a collision on the one hand, and on the other hand soft enough to effectively insulate against motor vehicle vibrations without exceeding a predetermined thickness. In particular it is the aim of the present invention to provide a shock absorbing carpet layer having a thickness of approx. 35 mm, which permits a force peak of up to 400 daN at a collision energy of 90 Joule, and which at the same time provides an acoustic insulation of at least about 20 dB in the range of 600 Hz.

These conflicting technical requirements are solved according to the present invention by means of an inner liner according to claim 1, and in particular by means of an inner liner having a multitude of shock absorbing and noise insulating areas which are distributed over its entire surface, whereby at least the shock absorbing areas are separated from the vehicle bottom by a decoupling layer.

The inventive structure of this liner corresponds to a spring-mass-system in which the mass-layer is arranged on the side of the passenger compartment and can be combined with the carpet layer, and in which spring-mass-system a shock absorbing structure is incorporated into the underlying spring layer. This shock absorbing structure is sectorially distributed over the entire surface, i.e. it only contacts the spring layer locally. By this means, the shock absorbing and sound insulating functions of the liner can be optimized according to its particular geometry and use. In particular, the relation between the shock absorbing areas and the spring layer areas can be varied, which is advantageous for liners being differently inclined or bent. Therefore, the inventive construction allows the normal vibrations of the vehicle bottom to be coupled to the acoustically insulating spring-mass-system (e.g. air spring), whilst these vibrations cannot be transmitted into the areas of the shock absorbing structure due to the decoupling layer. This is why this decoupling layer is highly porous and has a very low Young's module. For this reason, neither the framework of this decoupling layer (foam, fleece or flakes), nor the air locked therein can exert any substantial absorption. Rather, the air contained inside this structure can flow freely between the areas of the spring layer and cannot be compressed within this framework structure.

The maximum absorbable energy or impact force is substantially determined by the particular choice of material for the shock absorbing areas and their distribution over the entire surface of the liner.

It is to be understood that the spring-layer areas are filled either with air (Young's module>1 daN/cm$^2$) or with a suitable porous mass. Such masses are well known to the expert in the field of sound insulation and can be chosen for the particular purpose required. The geometric arrangement or structuring of the acoustically relevant spring layer areas and shock absorbing areas can also be optimized by the expert according to his requirements. For example, the support elements projecting into the spring layer can be hollowed out in a bowl-like shape in order to optimize the dynamic hardness of the shock absorbing structure. These supporting elements can be connected to each other via individual bridge-like links or areally, or can be coupled individually and independently of each other to the mass layer. Equally, the decoupling layer can be arranged uniformly over the entire supporting layer of the liner or only locally in the region of the shock absorbing support elements. This decoupling layer can be made of fleece, flakes or foam. It is understood that the mass layers, spring areas or shock absorbing areas can comprise a single or a number of layers and can have differing geometric forms. In particular, the entire liner part can have differing thicknesses and physical properties.

Although this inventive liner is proposed for use in the automobile industry, it can of course be used in all technical fields where acoustic insulating properties are desirable in combination with shock absorbing properties, e.g. in airplane construction, tunnel building or in protective helmets.

Preferred embodiments of the invention shall be more closely described with the aid of the following figures.

Figure 1:
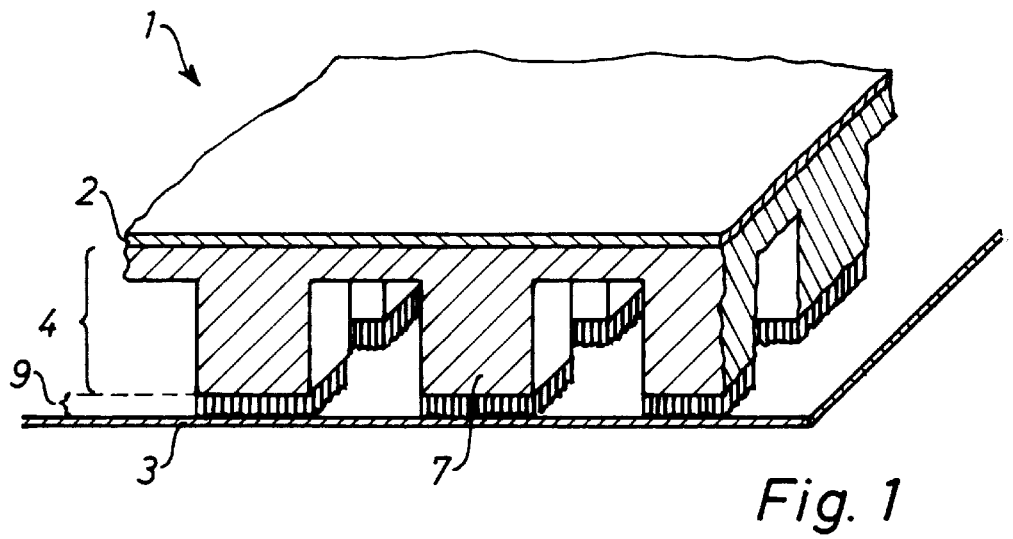
FIG. 1 shows a spatial view of a preferred embodiment of the inventive liner.

The embodiment of the inventive liner 1 as shown in FIG. 1 comprises a heavy layer 2 on the side of the passenger compartment, said heavy layer 2 being either a suitable rubber-like under-layer of a carpet 5 or a pile-free heavy layer 2 which is currently commercially available under the name SEPTUM®. A middle layer 4 is provided between this heavy layer 2 and the vehicle bottom 3, this middle layer 4 comprising a multitude of shock absorbing elements 7 and spring-layer areas 8. A decoupling layer 9 decouples the vehicle bottom 3 from the relatively stiff shock absorbing elements 7.

In the preferred embodiment of the invention the shock absorbing elements 7 of the middle layer 4 are formed to be support elements and can be in any shape.

This inventive construction corresponds to a spring-mass-system, in which the mass layer 2 is connected to a multitude of rigid elements 7 which extend into the spring layer 8 (air spring). These elements 7 are chosen such, that they can transform an impact energy of approx. 90 Joules completely into deformation energy. In the present embodiment of the invention, these shock absorbing elements 7 are made of foamed polystyrene having a density of 60 kg/m$^3$, they cover approx. 50% of the support area and have a rigidity at which an impact force of approx. 600 daN compresses a 33 mm thick liner (5 mm heavy layer, 35 mm foamed polystyrene, 3 mm glas fiber mat) to a thickness of 3.5 mm. The decoupling layer 9 has a very low air flow resistance and a relatively low Young's module (<0.1 daN/cm$^2$), i.e. it is extremely permeable to air and is barely elastic. This prevents the vibrations from the vehicle bottom being transmitted to the stiff shock absorbing elements 7 of the middle layer 4. The air enclosed in the decoupling layer 9 can therefore circulate essentially freely within this layer during vibration of the vehicle bottom. The actual suspension effect in this spring-mass-system is therefore exclusively carried out by the air contained in the spring-layer areas 8 which lie between the shock absorbing elements 7.

In the preferred embodiment according to FIG. 1 the decoupling layer has a thickness of approx. 2 mm and comprises a glass-fiber fleece. The maximum impact force which can be absorbed is essentially defined by the material used, by the relation of support area of the shock absorbing elements 7 to the total area, and by the thickness of these shock absorbing elements 7. In the frequency range of 600 Hz this embodiment has an acoustic insulation of approx. 20 dB.

Figure 2:
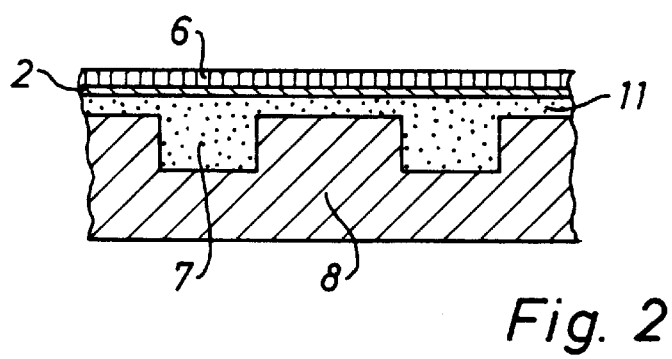
FIG. 2 shows a section through a second embodiment of the inventive liner.

In the embodiment shown in FIG. 2 the spring layer 8 is made of an acoustically effective foam and the stiff elements 7 project only slightly into this spring layer. In particular, the depth of the stiff elements 7 is 20 mm and the thickness of the spring-mass-system is 28 mm. The heavy layer being towards the passenger compartment has a thickness of 2 mm and carries a carpet pile 6.

Figure 3:
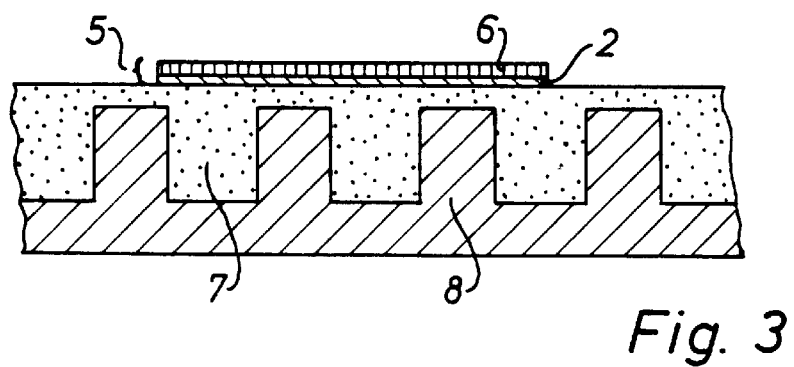
FIG. 3 shows a section through a third embodiment of the inventive liner.

In the third embodiment according to FIG. 3 the heavy layer is part of a carpet 5. The individual shock absorbing elements 7 can be structured or not, and in this embodiment have a height of 20 mm. In this and the two above mentioned embodiments the stiff elements 7 are surfacially connected to each other. The spring layer 8 is again made of a foam, but can, of course, be made of a fleece.

Figure 4:
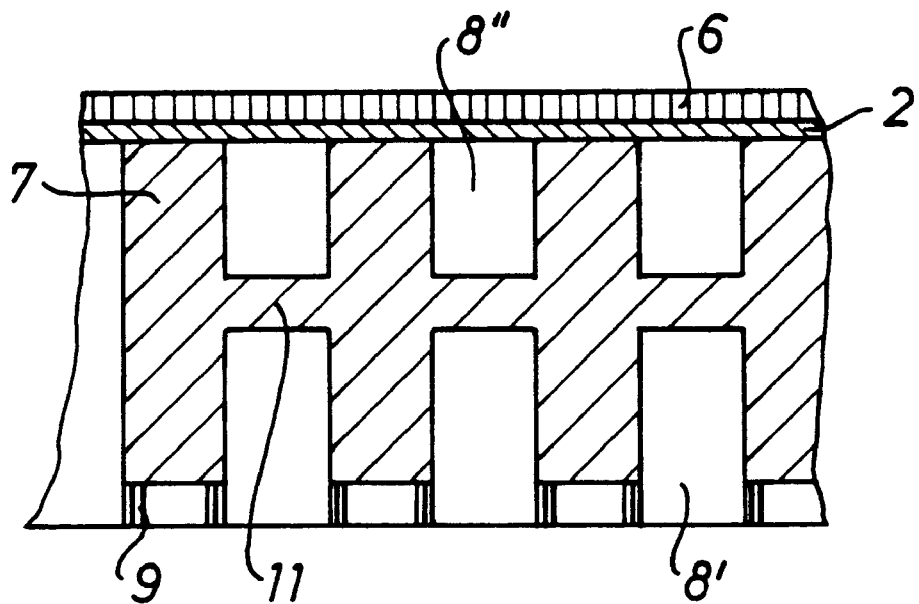
FIG. 4 shows a section through a fourth embodiment of the inventive liner.

In FIG. 4 a multitude of shock absorbing elements 7 are shown, which are centrically connected to each other via bridge-like links 11. The hollow cavities lying therebetween are not filled and form a mutually communicating hollow cavity system. The acoustic efficiency can be substantially increased thereby. The decoupling layer 9 is arranged only in the area of these stiff elements 7, but could be arranged over the entire surface. It is to be understood that the bridge-like links 11 between the individual stiff elements 7 can be formed as a plane and that two indpendent spring layers 8' and 8" can be formed.

Figure 5:
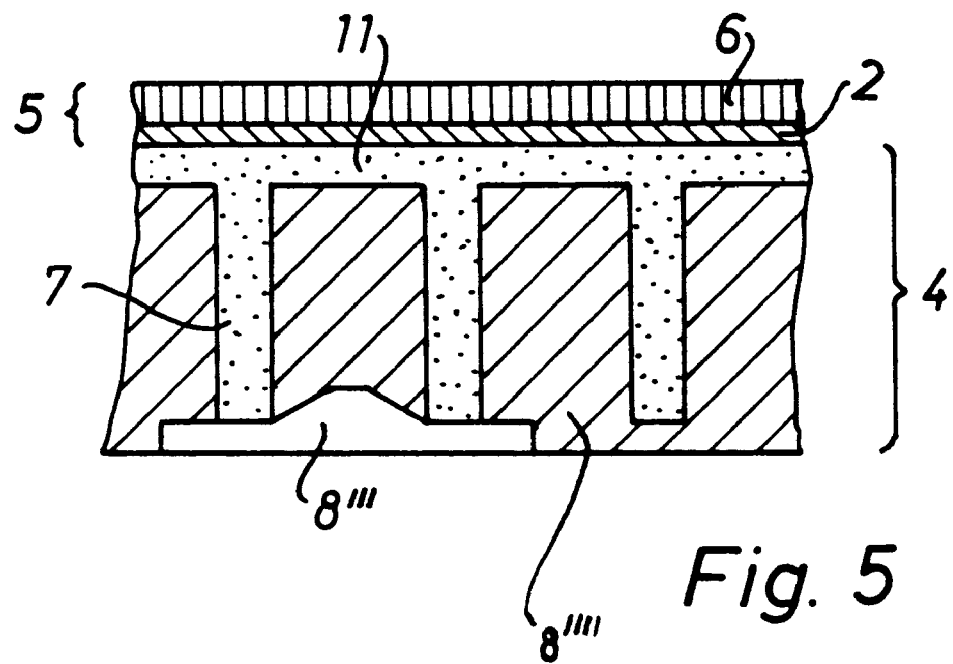
FIG. 5 shows a section through a fifth embodiment of the inventive liner.

In a further embodiment according to FIG. 5 the entire spring layer 8 consists of an air spring in combination with an elastic foam framework. In this embodiment the stiff elements 7 have a smaller diameter because of their increased hardness.

For all these embodiments solid polyurethane, polypropylene or polystyrene (caryl) are particularly suitable. It is to be understood that also foamed caoutchouc can be considered for the spring layer 8.

What is claimed is:

1. Shock absorbing liner for motor vehicles, said liner (1) comprising a middle layer (4) with a multitude of shock absorbing elements (7), said elements (7) projecting into a spring layer (8), and said middle layer (4) comprising a heavy layer (2) on the side of a passenger compartment, and comprising a decoupling layer (9) on a vehicle bottom side at least in the areas of the shock absorbing elements (7), said decoupling layer (9) having a Young's module of <0.1 daN/cm$^2$.

2. Liner according to claim 1, characterized in that the shock absorbing elements (7) have a weight by surface area of less than 100 kg/m$^2$ and are made of foamed polyurethane, polypropylene, polystyrene or a fleece.

3. Liner according to claim 1, characterized in that the shock absorbing elements (7) of the middle layer (4) make up around 40% to 60% of the entire surface of the shock absorbing liner.

4. Liner according to claims 1, characterized in that the shock absorbing elements (7) are evenly distributed over the entire surface of the liner.

5. Liner according to claim 1, characterized in that the shock absorbing elements (7) are unevenly distributed over the entire surface of the liner.

6. Liner according to claims 1, characterized in that the shock absorbing elements (7) are connected to each other via bridge-like links (11).

7. Liner according to claim 1, characterized in that the heavy layer (2) is part of a carpet (5).

8. Liner according to claim 7, characterized in that the heavy layer (2) is connected, and is adhesively connected or melted with the shock absorbing elements (7).

9. Liner according to claim 1, characterized in that the spring layer (8) is an open-pored foam or a fleece.

10. Liner according to claim 1, characterized in that the decoupling layer (9) extends over the entire area of the liner (1).

11. Liner according to claim 2, characterized in that the shock absorbing elements (7) of the middle layer (4) make up around 40% to 60% of the entire surface of the shock absorbing liner.

* * * * *